United States Patent [19]

Quick et al.

[11] Patent Number: 4,868,771
[45] Date of Patent: Sep. 19, 1989

[54] COMPUTER IMAGE GENERATION WITH TOPOGRAPHICAL RESPONSE

[75] Inventors: Lee T. Quick; Walter R. Steiner, both of Ormond Beach, Fla.

[73] Assignee: General Electric Company, Philadelphia, Pa.

[21] Appl. No.: 31,917

[22] Filed: Mar. 30, 1987

[51] Int. Cl.$^4$ .............................................. G06F 15/72
[52] U.S. Cl. .................................... 364/578; 364/522; 434/62; 434/69
[58] Field of Search ................. 434/29, 37, 38, 46, 434/48, 62, 63, 69, 305; 364/518, 521, 522, 578

[56] References Cited

U.S. PATENT DOCUMENTS

| | | | |
|---|---|---|---|
| 3,283,418 | 11/1966 | Brewer et al. | 434/29 X |
| 4,196,528 | 4/1980 | Foerst | 434/69 X |
| 4,238,826 | 12/1980 | Jones, Jr. | 364/522 X |
| 4,251,931 | 2/1981 | McKechnie | 434/29 |

Primary Examiner—Gary V. Harkcom
Assistant Examiner—Mark K. Zimmerman
Attorney, Agent, or Firm—Stephen A. Young; Paul Checkovich

[57] ABSTRACT

In a computer image generation system, the choice of a path for a vehicle model over a landscape is not restricted. Objects and features in an image to be displayed are defined by polygons. Plumb vectors, having a predetermined relationship with the vehicle model, are used to obtain samples of the terrain at the intersection between the vectors and polygons defining the ground in the vicinity of the vehicle model. The vectors may sample in advance of the vehicle model in the direction of motion or under the vehicle model. The polygons may be encoded with characteristics of the terrain they define so that appropriate noise cues can be generated from information extracted at the intersection of the plumb vectors and polygons. Predetermined ones of the sample points are interpolated for inferring the contour and slope of the terrain before interaction between the vehicle model and interpolated terrain is determined. The display of an image is modified in response to the real-time interaction between the vehicle model and local topology to reflect such interaction at a predetermined viewpoint.

17 Claims, 3 Drawing Sheets

COMPUTER IMAGE GENERATION WITH TOPOGRAPHICAL RESPONSE

BACKGROUND OF THE INVENTION

This invention relates to computer image generation with topographical response, and, more particularly, to computer image generation having the capability to present images in real time that reflect relative motion between a view-point and a simulated landscape or scene, wherein the relative motion is not pre-programmed or canned, but is derived from real-time sampling to determine the present interrelationship between the view-point and the scene.

The images depict scenes that would be viewed by an operator or passenger in a vehicle wherein the images reflect vehicle motion (pitch, roll and yaw) as the vehicle interacts with the environment of the scene it is traversing. In addition, the motion of a vehicle remote from a view-point may be presented as it interacts with topographical features of the scene.

Computer image generation has been used for facilitating instruction and/or training in the operation and control of a vehicle without need for actually operating the vehicle. A typical configuration includes a model or mock-up of an operator compartment having controls, monitors and status displays like those encountered in an actual vehicle, along with a display device for presenting images to the operator of scenes that would be observed by a driver of the actual vehicle over a real landscape.

Prior vehicle models have been confined to operate through simulated landscapes over predetermined paths, such as roads, bridges and highways, with excursions therefrom limited. Typically there was no rolling terrain so that the ground was flat, or for each place where the vehicle could be in the data base describing the landscape, a slope of the terrain was predeterminedly assigned. The first case over simplifies the simulation for non-conventional vehicle movement and the second requires substantial storage capability that may not be readily available or not feasible to implement.

With increasing popularity of recreational (RV), off-road and all-terrain vehicles, and the like, that are able to deviate from traditional vehicle routes and to navigate over the landscape, it would be desirable to present images in real-time that reflect the actual scenes that would be viewed by an operator while taking non-conventional paths over the landscape, wherein the freedom of choice of path is not restricted. Further, it would be desirable to supply information relating to the type of, or objects on, the terrain, such as asphalt, mud, rocks, boulders, shrubbery, for determining vehicle interaction therewith both for adding realism to the images presented, and for deriving audio cues, which are especially effective for assisting operator training of land based maneuvering.

Accordingly, it is an object of the present invention to present images acurately representing actual scenes that would be observed by an operator while directing a vehicle on non-conventional paths over the landscape without having to actually operate the vehicle.

Another object is to provide audio cues to the operator that correspond to real-time interaction between the vehicle and the landscape.

SUMMARY OF THE INVENTION

In accordance with the present invention, in a visual image generating system for creating visual images from stored data, wherein a feature of an image is defined by at least one polygon, a method for producing visual images reflecting real-time interaction between a vehicle model and an image to be displayed comprises sampling in real time the topography of the image to be displayed in the vicinity of the vehicle model for obtaining at least one sample indicative of the topography, determining interaction between the topography of the image to be displayed and the vehicle model in response to the at least one sample and modifying the image to be displayed in response to the interaction determined. An audio cue may be provided in response to a predetermined characteristic of the at least one sample.

For obtaining the samples, plumb vectors having a predetermined relationship to the vehicle may be used to determine a respective intersection with a polygon in the vicinity of the vehicle. For example, the plumb vectors may be referenced to respective range offset vectors that pass through the centroid of the vehicle. The centroid may be further referenced to a global or primary reference system.

The plumb vectors may be oriented forward the vehicle in the direction of motion or may be positioned to sample directly under the vehicle if the processing is rapid enough to present real time interaction between the vehicle and the landscape. Freedom of choice of the path of the vehicle over the terrain is not restricted.

When a plurality of sample points is obtained, interpolation among predetermined sample points, some of which may have been previously stored, is used to infer the contour, e.g. slope, of the topography prior to determining interaction between the interpolated portion of the topography of the image to be displayed and the vehicle model.

The features of the invention believed to be novel are set forth with particularity in the appended claims. The invention itself, however, both as to organization and method of operation, together with further object and advantages thereof, may best be understood by reference to the detailed description taken in connection with the accompanying drawing.

DETAILED DESCRIPTION

Figure 1:
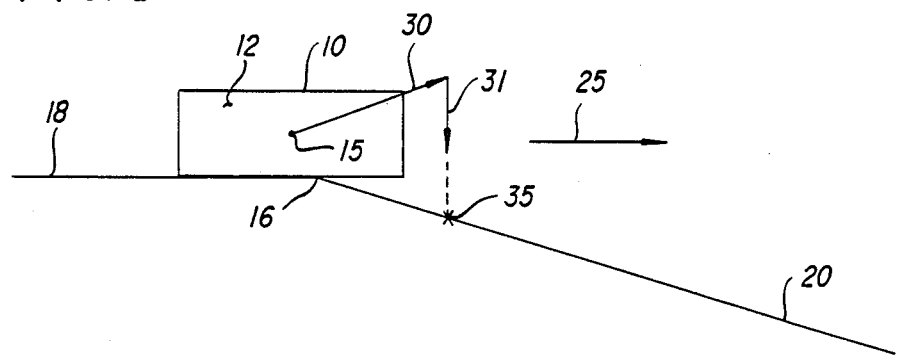
FIG. 1 is a view onto the side of a vehicle model and a schematic representation of a sampling scheme in accordance with the present invention.

Referring to FIG. 1, a vehicle model 10, having a centroid faces 18 and 20 representative of the landscape in the area around vehicle 10. Polygons 18 and 20 abut along common edge 16 and do not lie in the same plane. Present direction of motion for vehicle 10 is indicated by an arrow 25. A positioning or range offset vector 30 that is fixed in relation to vehicle 10 extends from centroid 15 of vehicle 10 beyond the extremity of vehicle 10 in the general direction of arrow 25. Vector 30 includes a vector component in the direction of arrow 25. A range, gravity or plumb vector 31 is directed toward the center of gravity of the earth from the end of range offset vector 30. An extension of plumb vector 31 intersects polygon 20 at point 35 so that at least one sample point is obtained. Thus, the distance from the end of vector 30 to polygon 20 at point 35, and the location of point 35 in space, may be determined. Since range offset vector 30 is fixed with respect to vehicle model 10, the distance from vector 30 to polygon 20 along vector 31 is indicative of the contour of polygon 20. The coordinates or vector location (with respect to the same coordinate system used to define vector 31) of intersection point 35 may be stored for subsequent processing.

Figure 2:
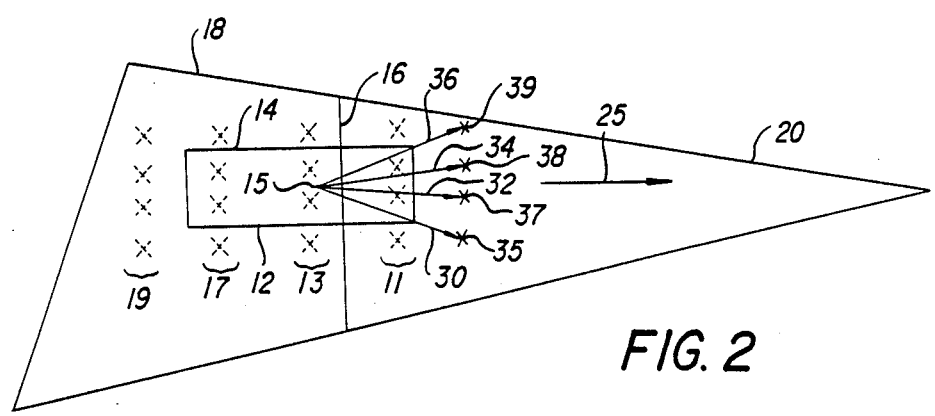
FIG. 2 is a view onto the top of the vehicle model of FIG. 1.

Referring to FIG. 2, a view looking onto the top of vehicle 10 is shown. It is noted that vector 30 further includes a lateral component so that vector 30 extends beyond an extension of side 12 of vehicle 10. Additional range offset vectors 32, 34 and 36 that are fixed with respect to vehicle 10 extend beyond vehicle 10 from centroid 15 in the general direction of arrow 25. Vector 36 includes a lateral component so that vector 36 extends beyond an extension of side 14 of vehicle 10. Vectors 32, 34 and 36 have a respective plumb vector (not shown) associated therewith analogous to the relationship between vector 30 and vector 31 (FIG. 1). An extension from each of the respective plumb vectors (not shown) associated with vectors 32, 34 and 36 intersects face 20 at points 37, 38 and 39, respectively. Thus, the distances along plumb vectors associated with vectors 32, 34 and 36 to points 37, 38 and 39, respectively, and/or the location of intersection points 37, 38 and 39 in space are indicative of the contour of the polygon 20 analogous to range offset vector 30, plumb vector 31 and polygon 20. The coordinates or vector location (with respect to the same coordinate system as used for the plumb vectors) of intersection points 37, 38 and 39 may be stored for subsequent processing.

Also shown is a grid of prior sample groups 11, 13, 17 and 19, each having a member corresponding to range offset vector 30, 32, 34 and 36. A predetermined number of sample groups that form the grid may be stored in memory for recall during processing of current samples 35, 37, 38 and 39, so that an adequate number of sample points is available to provide an accurate interpolation for inferring the contour and slope of the terrain with which vehicle 10 is presently interacting. The earliest sampled group, say group 19, may be eliminated from memory once vehicle 10 has passed the area associated therewith.

The direction and positioning of range offset vectors 30, 32, 34 and 36 may be modified to accommodate a change in direction 25 of vehicle 10. The number of range offset vectors and splay between the outermost ones should be selected so that the respective plumb vectors associated therewith generate terrain samples such that the features and contour of the ground over which vehicle 10 travels can be accurately determined from interpolation of the samples. Typically samples 35, 37, 38 and 39 will be taken at a predetermined instant resulting in discrete rather than continuous samples. In accordance with the present invention, the values of intersection or sample points 35, 37, 38 and 39 are interpolated along with the values of predetermined samples from prior groups 11, 13, 17 and 19 to determine in real time the type and contour of the terrain that vehicle 10 will next encounter if it continues moving in the direction of arrow 25.

It is to be understood that in a real vehicle, drive means, such as a wheel or tread, and guide means, such as runners (if used—e.g. snowmobile), contact the ground and couple reactions between the vehicle and the terrain. The type of drive and guide means, along with general characteristics of the real vehicle, such as weight, stopping distance, speed limitations and acceleration, are preidentified and incorporated into vehicle model 10 and typically reside in a host computer system.

Criteria for determining the inverval between successive sample points include the rate of change or gradient of the terrain, whether the vehicle is turning and rate of turning, velocity of the vehicle, and character of the terrain, such as roughness, uniformity, and composition, e.g. sand, gravel, mud. As the velocity of vehicle model 10 increases, processing demands typically increase since generally it is desired that the interval between samples decrease for increasing velocity of vehicle 10.

Figure 3:
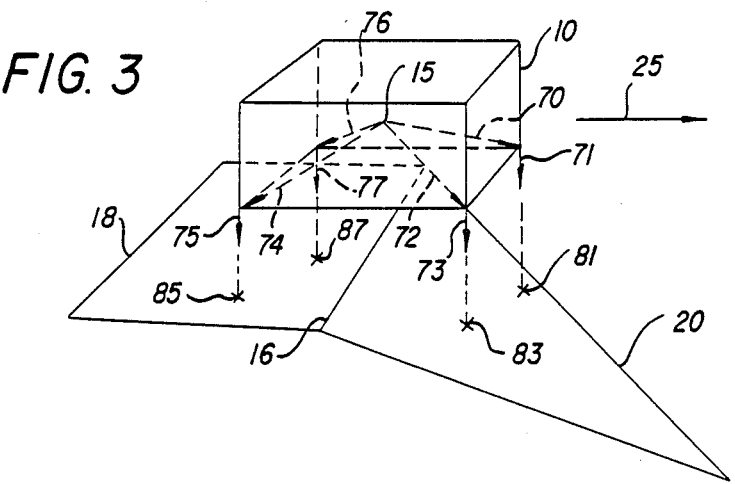
FIG. 3 is a perspective view of a vehicle model and a schematic representation of another sampling scheme in accordance with the present invention.

Referring to FIG. 3, a schematic representation of another sampling scheme in accordance with the present invention is shown. Range offset vectors 70, 72, 74 and 76 extend from centroid 15 of vehicle model 10 toward respective extremities or corners of vehicle 10. Extending toward the center of the earth from the end of each range offset vector 70, 72, 74 and 76 is a respective plumb vector 71, 73, 75 and 77. An extension of plumb vectors 71 and 73 strikes polygon 20 at sample points 81 and 83, respectively, and an extension of plumb vectors 75 and 77 strikes polygon 18 at sample points 85 and 87, respectively. Plumb vectors 71 and 77 may be oriented to correspond to a position over vehicle propulsion means, such as power driven wheels, of a real vehicle and/or over vehicle traction means, such as undriven wheels, of a real vehicle that are typically disposed along one side of vehicle 10, and plumb vectors 73 and 75 may be similarly oriented on the opposite side of vehicle 10. Plumb vectors 71, 73, 75 and 77 thus sample terrain under vehicle 10.

In order to use the configuration shown and described with respect to FIG. 3, it is necessary that processing of data values from sample points 81, 83, 85 and 87 be rapid enough so that responses to the interaction between vehicle 10 and the terrain represented by polygons 18 and 20 are accurately reflected by updating the relationship between a display and a viewpoint during each field cycle. In one common scheme related to a U.S. television standard, two fields are interleaved to provide an updated image thirty times a second. Thus, all processing for a field must be completed within one-sixtieth of second, every sixtieth of a second.

Figure 4:
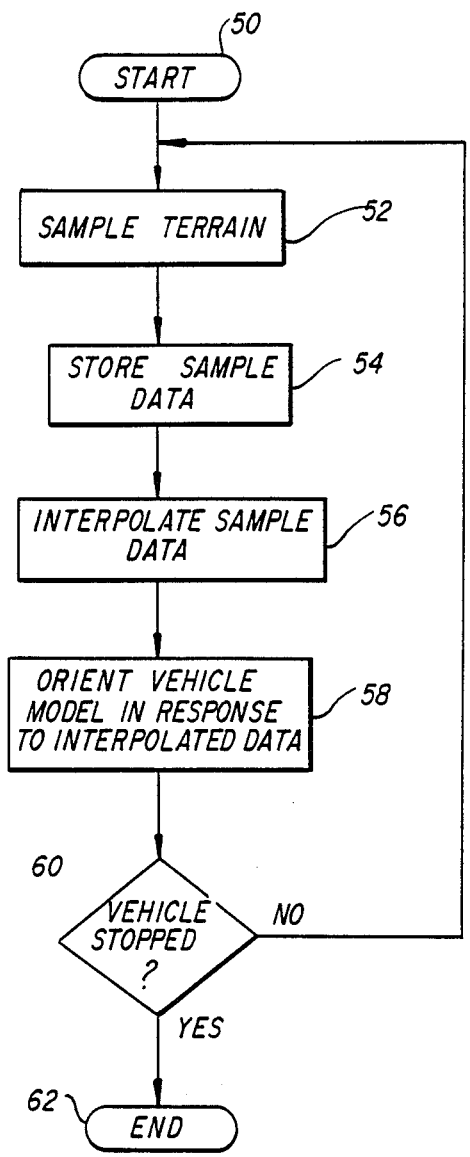
FIG. 4 is a flow diagram of a method for sampling terrain in accordance with the present invention.

Referring to FIG. 4, a flow diagram of a method useful with the present invention is shown. A program begins at step 50 and executes step 52 to sample at predetermined points the terrain represented by polygons in the vicinity of a vehicle. The vehicle may be a simulated or model one which an operator is maneuvering and controlling to travel through a data base representative of a landscape, or it may be a vehicle remote from the view point of an operator/observer.

Performance of step 54 stores the data obtained by sampling the terrain so that it is available for further processing. The stored data forms a grid of samples. As noted above, storing data is generally required when sampling occurs in accordance with the configuration of the present invention shown and described with respect to FIGS. 1 and 2. For the configuration illustrated and set forth above with respect to FIG. 3, step 54 may be eliminated, if desired, and step 56 may be performed directly after executing step 52.

In one type of computer image generation, a plurality of polygons having a predetermined spatial relationship with respect to each other are used to represent features and objects of a scene to be displayed. For example, representation of a hill in a landscape may be implemented by arranging a plurality of contiguous polygons whose size and slope piece-wise linearly approximate the contour of the hill. Without more, the surface of the hill would appear faceted due to the line visible at the juncture of polygons having different slopes. The polygons may be textured and/or shaded for camouflaging or hiding the lines at the abutment of neighboring polygons and for suggesting to a viewer a contour or shape other than a basically flat appearance available from an unmodified polygon. Polygon descriptors are generally available from a data base which may be stored in a mass storage medium such as magnetic disk or tape.

Execution of step 56 interpolates the transitions between sample data points, both the current ones and predetermined ones from the stored grid, for extrapolating or inferring the contour of the terrain defined by the polygons from which the samples were obtained. Performance of step 58 determines the interaction between the topography of the terrain from which the samples were obtained and the vehicle and orients the vehicle model attitude and/or the visual display in response to the interpolated values of polygon samples as the vehicle model moves through the data base scene. The slope of the inferred contour of the terrain is used to determine the roll, pitch and yaw components of the interaction between the vehicle model and the terrain. The changes in roll, pitch and yaw that are determined for the vehicle model are related to the dynamics of the vehicle, e.g. pivot points, weight, inertia, so that unrealistic effects are avoided.

Attitude of the vehicle model for reflecting real-time interaction may be effected by different techniques depending on the type of display system used. For a vehicle model depicted in a scene of a display and remote from a view-point, the model is oriented with respect to its local landscape to reflect real-time interaction between the vehicle and the local terrain. For a display that presents what an operator/observer sees from a view-point within the control station of a vehicle, an offset that corresponds to the roll, pitch and yaw components of the real-time interaction of the vehicle with its local terrain may be added to the display so that the display reflects real-time interaction between the vehicle and the local terrain.

In another display configuration, the control compartment for the operator/observer may be supported so that it can move with respect to the display. The roll, pitch and yaw components of the real-time interaction of the vehicle with the local terrain of the data base are supplied to the motion control system for the control compartment so that movement of the control compartment may be modified to reflect the actual motion a vehicle would experience while interacting with the landscape represented by the data base.

Polygons may also be encoded with characteristics or attributes of the terrain, such as mud, gravel and asphalt, so that the value of each sample point of a polygon also includes an indication of the type of terrain. This permits additional realism to be incorporated into the response of the vehicle model and also enables generation of appropriate noise cues corresponding to the part of the vehicle interacting with the attribute.

Execution of step 60 determines whether the vehicle has stopped. If it has not stopped, then the program follows the N path and returns to perform step 52. If the vehicle has stopped when step 60 is performed, then the program proceeds along the Y path to execute step 62 which causes this portion of the program to end.

Figure 5:
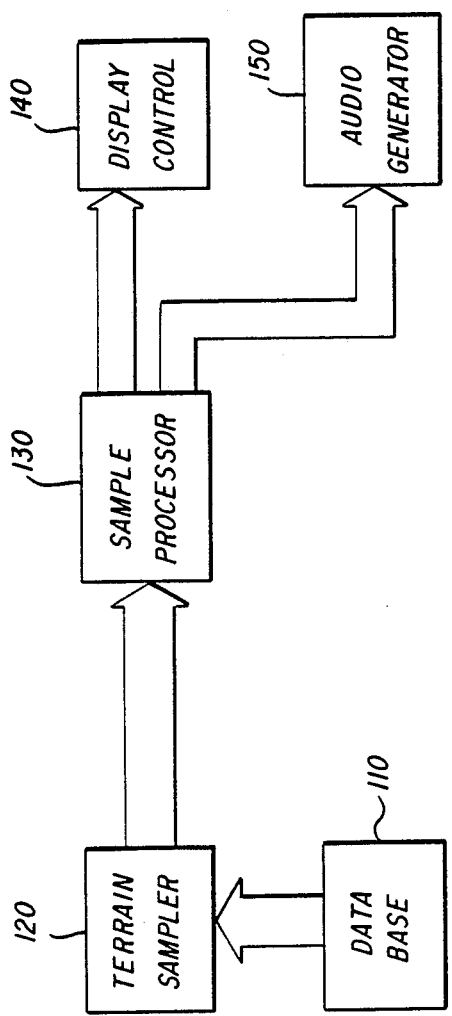
FIG. 5 is a block diagram of a display system in accordance with the present invention.

Referring to FIG. 5, a block diagram of a display system in accordance with the present invention is shown. A terrain sampler 120 has an input coupled to an output of data base 110 for receiving descriptors of the polygons that form the landscape over which a vehicle model can roam. Terrain sampler 120 determines in real time the intersect points between plumb vectors and the polygons as herein before explained. Intersect point descriptors are provided to an output of terrain sampler 120 that is connected to an input of sample processor 130.

Sample processor 130 acts on the data supplied thereto both for determining the real-time roll, pitch and yaw components of the interaction between the model vehicle and the landscape model base in response to distances along plumb vectors, and for extracting terrain attribute information therefrom.

Sample processor 130 includes a respective output coupled to a respective input of a display control 140 and an audio generator 150. Display control 140 responds to the roll, pitch and yaw data provided thereto from sample processor 130 for modifying the images to be displayed so that they reflect the real-time interaction between the vehicle model and the landscape with respect to a predetermined view-point. Audio generator 150 responds to the attributes of the terrain supplied thereto from sample processor 130 for producing audio cues in response to the real-time interaction between the vehicle model and the terrain.

In order to increase the efficiency and throughput of the system, data transfers among data base 110, terrain sampler 120, sample processor 130, display control 140 and audio generator 150 may be made along parallel data paths as shown in FIG. 5.

In an alternative embodiment (not shown) the roll, pitch and yaw data from sample processor 130 may be supplied to a motion control system for controlling the motion of a moveable control compartment of a vehicle model in response to the real time interaction between the vehicle model and the landscape.

Thus has been illustrated and described apparatus and method for accurately representing actual images that would be observed by an operator while directing a vehicle on non-conventional paths over a landscape without having to actually operate the vehicle. In addition, apparatus and method for providing audio cues to the operator in response to real-time interaction between the vehicle and the landscape have been shown and described.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. In a computer visual image generating system for creating visual images from stored data, wherein a feature of an image is defined by at least one polygon, a method for producing visual images reflecting real-time interaction between a vehicle model having a predetermined vicinity and a landscape having a predetermined topography, wherein the vehicle is movable in any direction throughout the landscape, comprising:

sampling in real time the stored data for the topography of the landscape in advance of the vehicle model in the direction of motion of the vehicle model for obtaining at least one sample indicative of the topography, the topography having a contour; determining interaction between the topography of the landscape and the vehicle model in response to the at least one sample; and modifying the image of the landscape to be displayed with respect to a predetermined view-point in response to the interaction determined.

2. The method as in claim 1, further comprising providing an audio cue in response to a predetermined characteristic of the at least one sample.

3. The method as in claim 1, wherein the step of sampling includes obtaining a plurality of samples indicative of the topography and sampling in advance of the vehicle model in the predetermined direction.

4. The method as in claim 3, further including:
storing the plurality of samples; and
interpolating among the values of predetermined ones of the plurality of samples for inferring the contour of the topography of the landscape, wherein the step of determining includes determining interaction between the topography of the landscape and the vehicle model in response to the interpolated values.

5. The method as in claim 4, wherein the step of sampling includes selecting the respective intersections of a predetermined plurality of plumb vectors having a respective predetermined relation to the vehicle model with appropriate polygons for obtaining the plurality of samples.

6. The method as in claim 4, wherein the step of storing further includes storing samples in a grid and eliminating samples from the grid representing an area with which the vehicle model has already interacted.

7. The method as in claim 3, wherein the step of sampling includes selecting the respective intersections of a predetermined plurality of plumb vectors having a respective predetermined relation to the vehicle model with appropriate polygons for obtaining the plurality of samples.

8. The method as in claim 3, wherein the step of modifying includes updating the image once each frame cycle and further wherein the steps of determining and sampling are performed once each frame cycle.

9. The method as in claim 1, wherein the step of sampling includes sampling under the vehicle.

10. The method as in claim 1, wherein the step of sampling includes identifying the intersection of a plumb vector having a predetermined relation to the vehicle model with a predetermined polygon for obtaining the at least one sample.

11. In a computer visual image generating system for producing visual images from stored data, a method for presenting the visual images for reflecting real-time interaction between a vehicle model having a predetermined vicinity and a landscape having a predetermined topography wherein the vehicle model is moveable in any direction throughout the landscape, comprising:

sampling in real time the stored data for the topography of the landscape in advance of the vehicle model in the direction of motion of the vehicle model, the topography having a contour;
determining interaction between the topography of the landscape and the vehicle model in response to the at least one sample; and
displaying the image of the landscape for reflecting real-time interaction between the vehicle model and the landscape in response to the interaction determined.

12. The method as in claim 11, further comprising providing an audio cue in response to a predetermined characteristic of the at least one sample.

13. The method as in claim 11, wherein the step of sampling includes obtaining a plurality of samples indicative of the topography of the landscape and sampling in advance of the vehicle model in the predetermined direction and further wherein the method includes:
storing the plurality of samples;
interpolating among the values of predetermined ones of the plurality of samples for inferring the contour of the topography of the landscape; and
determining interaction between the topography of the landscape and the vehicle model in response to the interpolated values.

14. The method as in claim 11, wherein the step of sampling includes obtaining a plurality of samples indicative of the topography by selecting the respective intersections with appropriate polygons of a predetermined plurality of plumb vectors having a respective predetermined relation to the vehicle model and the step of determining includes determining interaction between topography of the landscape and the vehicle model in response to the distance between respective intersections and respective predetermined points on respective ones of the plurality of plumb vectors.

15. In a visual image generating system for creating visual images from stored data, wherein a feature of an image is defined by at least one polygon, apparatus for producing visual images reflecting real-time interaction between a vehicle model movable throughout an image to be displayed and the image to be displayed, comprising:

sampling means for determining in real time the intersection between a plumb vector having a predetermined relationship with respect to the vehicle model and a polygon;
processing means coupled to the sampling means, the processing means for determining the distance from a predetermined point on the plumb vector to the intersection; and
display means coupled to said processing means, the display means for presenting the image to be displayed in response to the distance determined such that the image to be displayed reflects real time interaction between the vehicle model and the image to be displayed.

16. The apparatus as in claim 15, wherein the sampling means include means for determining in real time the intersections between the polygon and a plurality of plumb vectors having a respective predetermined relationship with respect to the vehicle model and further wherein the processing means include means for interpolating among predetermined ones of the intersections for inferring the contour of the topology of the scene to be displayed and further wherein the display means for presenting the image to be displayed in response to the inferred contour.

17. The apparatus as in claim 15, wherein polygons are predeterminedly encoded with characteristics of the feature they define and the apparatus further including audio generating means coupled to the processing means, the audio generating means for producing an audio cue in response to a characteristic of the feature ascertainable from the characteristic of the polygon at the intersection.

* * * * *